United States Patent [19]
Ragan

[11] Patent Number: 5,155,479
[45] Date of Patent: Oct. 13, 1992

[54] RADIO RECEIVER WITH ADAPTIVE ON-OFF CONTROL

[75] Inventor: Lawrence H. Ragan, Richardson, Tex.

[73] Assignees: Seiko Corp.; Seiko Epson Corp., both of Japan

[21] Appl. No.: 668,369

[22] Filed: Mar. 13, 1991

Related U.S. Application Data

[63] Continuation of Ser. No. 422,878, Oct. 17, 1989, abandoned.

[51] Int. Cl.[5] .............................................. H04Q 7/00
[52] U.S. Cl. ............................... 340/825.44; 455/343; 370/105.1; 370/100.1
[58] Field of Search ........... 340/825.44, 311.1, 825.14, 340/825.47, 825.2; 455/343, 32, 38; 379/57, 63; 370/100.1, 103, 105.1, 106

[56] References Cited
U.S. PATENT DOCUMENTS

| | | | |
|---|---|---|---|
| 4,383,257 | 5/1983 | Gallianza et al. | 455/38 |
| 4,668,949 | 5/1987 | Akahori et al. | 340/825.47 |
| 4,694,473 | 9/1987 | Etoh | 379/63 |
| 4,803,703 | 2/1989 | DeLuca et al. | 370/106 |
| 4,897,835 | 1/1990 | Gaskill et al. | 340/825.44 |

FOREIGN PATENT DOCUMENTS

0136050  10/1981  Japan ............................. 340/825.44

*Primary Examiner*—Donald J. Yusko
*Assistant Examiner*—Peter S. Weissman
*Attorney, Agent, or Firm*—Elmer Galbi

[57] ABSTRACT

A paging system using synchronized transmission protocol and remote pagers active during monitor intervals to receive data transmitted during corresponding message intervals is provided with adaptive on-off radio receiver control for reducing monitor interval duration to conserve battery power and for centering message intervals within corresponding monitor intervals to increase message reliability. The adaptive on-off control is a function of a recent history of timing errors and thereby accounts for environmental conditions.

4 Claims, 5 Drawing Sheets

PRIOR ART
FIG. 1

$$AD = BD - \tfrac{1}{2}(MI-SI)$$

RADIO RECEIVER WITH ADAPTIVE ON-OFF CONTROL

This application is a continuation of application Ser. No. 07/422,878, filed Oct. 17, 1989, now abandoned.

RELATED APPLICATIONS

The present application relates to application Ser. No. 422,825 titled ADAPTIVE ON-OFF CONTROL FOR RADIO RECEIVER, filed concurrently herewith on Oct. 17, 1990 and commonly owned by the assignor of the present application.

FIELD OF THE INVENTION

The present invention relates to radio receivers and, more particularly, to a paging system employing radio receiver pagers with adaptive on-off control.

BACKGROUND OF THE INVENTION

In a typical paging system, a broadcast station transmits message data, using radio waves, to the radio receivers of remote pagers. Most remote pagers are small portable devices carried by individuals. As portable devices, remote pagers carry a battery power source requiring replacement or recharge. It is, therefore, desirable that remote pager radio receivers be power efficient.

In U.S. Pat. No. 4,713,808, issued Dec. 15, 1987 to Gaskill, et al., remote pager power consumption is greatly reduced by a synchronized transmission protocol wherein radio receivers of individual remote pagers are active during predetermined associated time slots to monitor a selected one of several broadcast stations, or frequencies, for message data. The one or several broadcast stations are programmed to broadcast message data for a selected remote pager during time slots associated with that remote pager. Remote pagers, having radio receivers active only during brief monitor intervals, conserve power, yet reliably receive message data.

Synchronized transmission protocols, such as the above described Gaskill system, necessarily use a monitor interval longer than the associated time slot. Unavoidable timing errors preclude absolute timing precision. A longer monitor interval increases the possibility that the radio receiver will be turned on during the associated time slot. While the radio receiver is turned on, it captures radio transmitted message data. The pager then examines the captured data to locate pertinent message data, that is, data broadcast during the time slot associated with the pager. Because the monitor interval is necessarily longer than the time slot, the radio receiver is on for a time before the associated time slot and for a time following the associated time slot. Such additional radio receiver on time contributes to inefficient power consumption. Accordingly, it is desirable that the monitor interval be long enough to reliably receive message data, yet short enough to improve power conservation.

In any synchronized transmission protocol involving remote receiving devices, such as remote pagers, absolute synchronization is virtually impossible. Because the operating environment for each remote pager changes, the timing circuitry of each remote pager is affected and its timing or synchronization capability degraded. If the operating environment for the remote pager were absolutely static, and perfect timing circuitry were available, it would be possible for the remote pager to activate its radio receiver at the instant before an associated time slot. The radio receiver would be on substantially only during the associated time slot and radio receiver power consumption would be minimized.

Unfortunately, such perfection is not possible in the real world and it has been necessary to provide a monitor interval longer than the associated time slot. More particularly, to maintain high message reliability, it is necessary to provide a monitor interval long enough to accommodate a broad range of potential variations in environmental conditions through the lifetime of the remote pager. At one extreme of this range, environmental conditions place time slots at the beginning of the associated monitor interval, and at the opposite extreme, prevailing conditions place time slots at the end of the corresponding monitor interval. It is desired that time slots be generally centered within the corresponding monitor interval such that positive or negative timing errors do not affect message reliability. Thus, while it may be desirable to reduce the duration of monitor intervals to improve power conservation, such reduction can degrade message reliability because time slots are less likely to be centered relative to, or even concurrent with, the corresponding monitor interval.

OBJECTS AND ADVANTAGES OF THE INVENTION

It is, therefore, an object of the present invention to improve power conservation in a synchronized radio receiver.

It is a further object of the present invention to provide adaptive on-off radio receiver control responsive to changing operating environments.

It is yet a further object of the present invention to provide adaptive on-off radio receiver control while reliably receiving message data such that the process of improving radio receiver power conservation does not interfere with message reception.

SUMMARY OF THE INVENTION

The foregoing objects and advantages are achieved by a radio receiver having adaptive on-off control responsive to detected timing errors. Radio receiver on time is reduced and power conservation is improved.

A principle embodiment of the present invention is employed in a radio communication system having a sending device and a receiving device synchronized for communication whereby the sending device transmits a message to the receiving device during a predetermined message interval and the receiving device activates during a corresponding monitor interval to receive the transmitted message. The present invention offers a method of controlling activation of the receiving device by adaptive registration to increase the probability of centering message intervals relative to corresponding monitor intervals. The adaptive registration is a function of the occurrence of prior message intervals relative to corresponding prior monitor intervals. Such adaptation increases message reliability by increasing the probability that a given message interval will occur during a given monitor interval. Further adaptation of monitor intervals is accomplished by reducing the duration of monitor intervals. This adaptation reduces radio receiver on time to conserve battery power.

In a first aspect of the present invention, adaptation of a given monitor interval is based on the occurrences of a plurality of recent message intervals relative to the corresponding monitor intervals. The process of adapting the given monitor interval is based on a consistency in cumulative recent timing errors and thereby accounts for current environmental conditions affecting synchronization. In this manner, short term changes in the operating environment of the remote pager are not reflected in adaptation of the monitor interval while long term changes in the operating environment of the remote pager are reflected in adaptation of the monitor interval.

In a second aspect of the present invention, adaptation of a given monitor interval is accomplished by capturing data during a series of monitor intervals, locating pertinent message data within the captured data, noting timing errors based on the position of pertinent message data within the captured data, and adapting the registration and duration of subsequent monitor intervals based upon the noted timing errors.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

For expository convenience, the present invention will be illustrated with reference to a paging system (the "Gaskill system") described in U.S. Pat. No. 4,713,808 and in allowed application Ser. No. 07/121,139, and now U.S. Pat. No. 4,897,835. However, it will be understood that the invention is not so limited. The disclosures of U.S. Pat. No. 4,713,808 and allowed application Ser. No. 07/121,139 are incorporated herein by reference.

Figure 1:
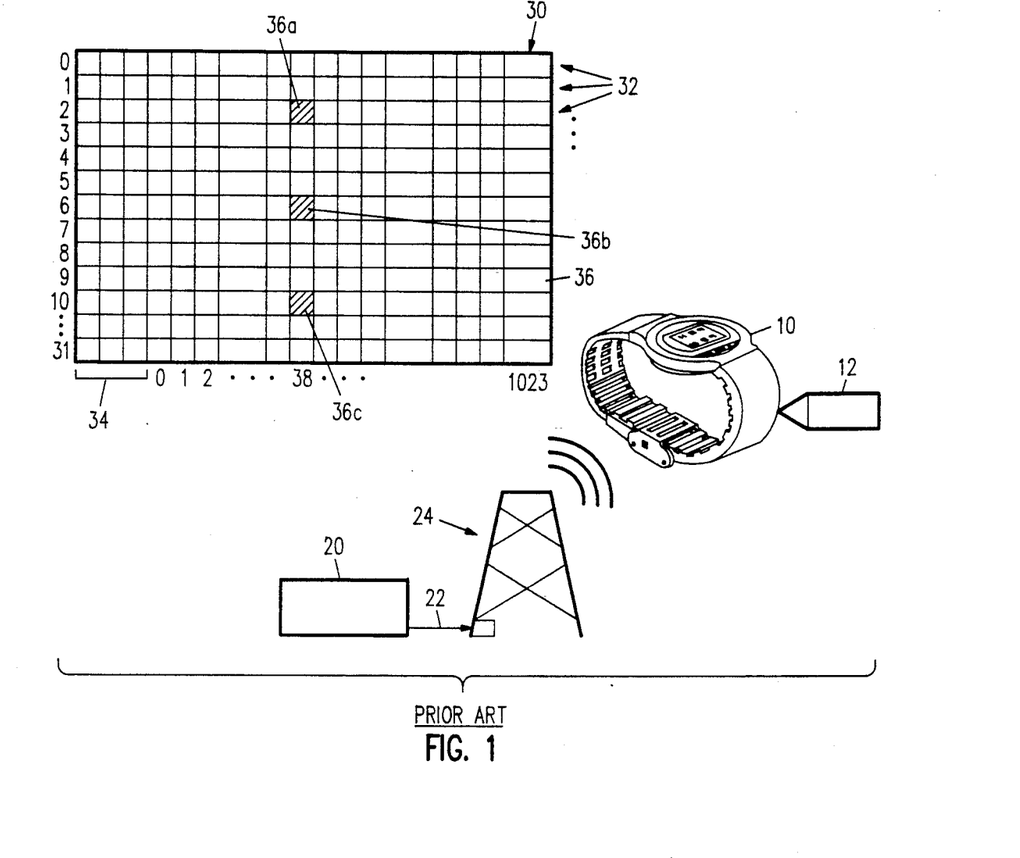
FIG. 1 illustrates a prior art paging system using a synchronized transmission protocol wherein remote pagers activate during monitor intervals to receive message data transmitted during shorter corresponding time slots.

The Gaskill system includes a number of wrist-watch remote pagers 10, of which one appears in FIG. 1, each having an associated pager address value 12 for identifying each remote pager 10 and determining when each remote pager 10 activates its radio receiver to receive message data. A central clearinghouse 20 processes and broadcasts message data to remote pager 10. Clearinghouse 20 communicates by way of communication link 22 to antenna tower 24 for broadcasting an FM radio signal to remote pager 10. Clearinghouse 20 is a fully automated, centralized facility which accepts messages, validates customer identification, determines message destinations, and routes messages to the appropriate broadcast station facility, e.g., tower 24, for transmission.

In accordance with the protocol of the Gaskill system, clearinghouse 20 and remote pager 10 both reference a time frame 30 divided into sub-frames 32, appearing as rows numbered 0 to 31 in FIG. 1. Each sub-frame 32 is further divided into three control time slots 34 and message time slots 36. The message time slots 36 are numbered 0 to 1023 in FIG. 1. Time frame 30 is of predetermined length, such as 7 and one-half minutes, and repeats cyclically. Thus, each sub-frame is approximately 14 seconds long and each of time slots 34 and 36 is approximately fourteen milliseconds long.

Address values 12 determine which message time slots 36 in time frame 30 are associated with a given remote pager 10. For example, remote pager 10 of FIG. 1 is programmed to activate 8 times during each cycle of time frame 30, beginning in message data time slot number 38 of sub-frame 2 and repeating every fourth sub-frame, i.e., in subsequent sub-frames 6, 10, 14, 18, 22, 26 and 30. Only the first three message time slots, 36a–36c, associated with remote pager 10 are shown in FIG. 1.

Thus, the paging system in FIG. 1 uses a synchronized transmission protocol wherein remote pager 10 activates its radio receiver circuitry prior to commencement of an associated message time slot 36 in order to receive message data transmitted during the associated time slot 36. Remote pager 10 is subject to changing environmental conditions including potentially drastic changes in temperature. Because of the potential for environmental changes, and the effect that such changes have on the timing capability of remote pager 10, it is necessary that remote pager 10 activate during a monitor interval longer than each associated message time slot 36 such that slight timing errors will not result in lost message data.

Figure 2:
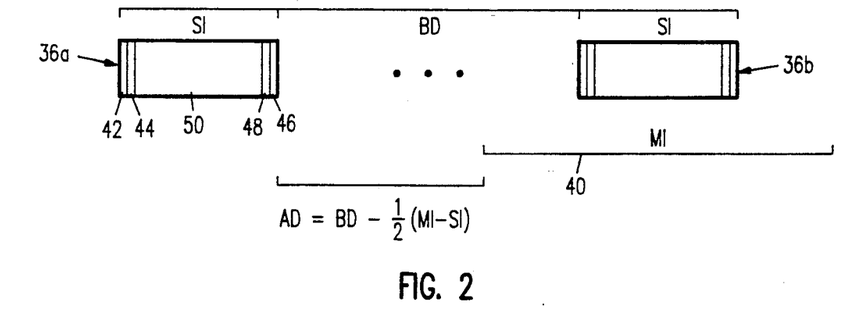
FIG. 2 illustrates time slots of the transmission protocol of the system of FIG. 1 and delay periods relative to calculation of an activation delay.

FIG. 2 illustrates two message data time slots, 36a and 36b, each associated with remote pager 10. Each message data time slot 36 carries 260 bits of information. The first eight bits of each time slot 36 carry a flag 42 indicating the beginning of a message data time slot 36. Another sixteen bits of each time slot 36 carry an address field 44 uniquely identifying the time slot 36 in terms of sub-frame and slot number. The last four bits of each time slot 36 comprise a padding field 46. Just prior to padding field 46 is an eight bit flag 48 indicating the end of a time slot 36. The remaining fields 50 of each time slot 36 carry such information as message data, message numbers, continuation numbers, and frame check sequence numbers.

Under ideal circumstances, remote pager 10 would activate its radio receiver at the beginning of associated time slot 36a, capture message data broadcast during time slot 36a, deactivate its radio receiver at the end of time slot 36a, and set a timer for a base delay BD to re-activate the radio receiver at the beginning of the next associated time slot 36, i.e., time slot 36b.

Unfortunately, it is not possible to achieve such timing precision. To reliably receive message data, the monitor interval 40 is longer than the associated time slot 36 and begins much earlier than the associated time slot 36. The radio receiver of remote pager 10 is then more likely to be active during the associated time slot 36 despite timing errors due to environmental conditions.

Subsequent to monitoring time slot 36a, remote pager 10 references the end of time slot 36a to calculate an activation delay AD determining commencement of monitor interval 40. The activation delay AD is a function of the duration MI of monitor interval 40, the duration SI of time slot 36, and base delay BD representing the separation between time slots 36a and 36b. The activation delay AD may be computed in the following manner to center time slot 36b within next monitor interval 40:

$$AD = BD - \tfrac{1}{2}(MI - SI)$$

Whether or not time slot 36b is actually centered with respect to monitor interval 40 depends on the accuracy of the timing circuitry of remote pager 10 as compared to its reference time frame 30. In any case, with time slot 36b theoretically centered within monitor interval 40, remote pager 10 is likely to be ready to receive monitor data during time slot 36b despite a positive or a negative timing error. If the timing circuitry of remote pager 10 is fast, time slot 36b occurs later in message interval 40. Similarly, if the timing circuitry is slow, time slot 36b appears more toward the beginning of monitor interval 40. As environmental conditions for remote pager 10 change, the position of each time slot 36 within the corresponding monitor interval 40 changes. Because such environmental conditions cannot be predicted, it has been necessary to provide a monitor interval 40 of sufficient duration to accommodate drastic environmental changes. Because message reliability is a high priority, each time slot 36 should not occur outside the corresponding monitor interval 40.

The present invention provides a method for adapting monitor interval 40 relative to the associated time slot 36 in light of current environmental conditions. According to this method, the duration MI of monitor interval 40 is reduced without significantly reducing message reliability. It is assumed that environmental conditions under which remote pager 10 operates change relatively slowly. That is to say, while drastic environmental changes do occur, it may be assumed that environmental conditions remain static for certain periods of time. For example, the user may be in a building for several hours. During such periods of static environmental conditions, timing errors in the circuitry of remote pager 10 are likely to be consistent. Once such consistent timing errors are detected, remote pager 10 adapts the duration of monitor interval 40 to conserve battery power and the registration of monitor interval 40 to center the corresponding time slot 36.

In accordance with a principle embodiment of the present invention, remote pager 10 begins with a conservative monitor interval much longer than, and commencing well in advance of, the associated time slot 36. Remote pager 10 then tracks timing errors each time it activates its radio receiver. By examining data captured during monitor interval 40 and locating the associated time slot 36 within the captured data it is possible to determine the timing error, more particularly, to determine the position of time slot 36 within monitor interval 40 and the excess radio receiver on-time.

Figure 3:
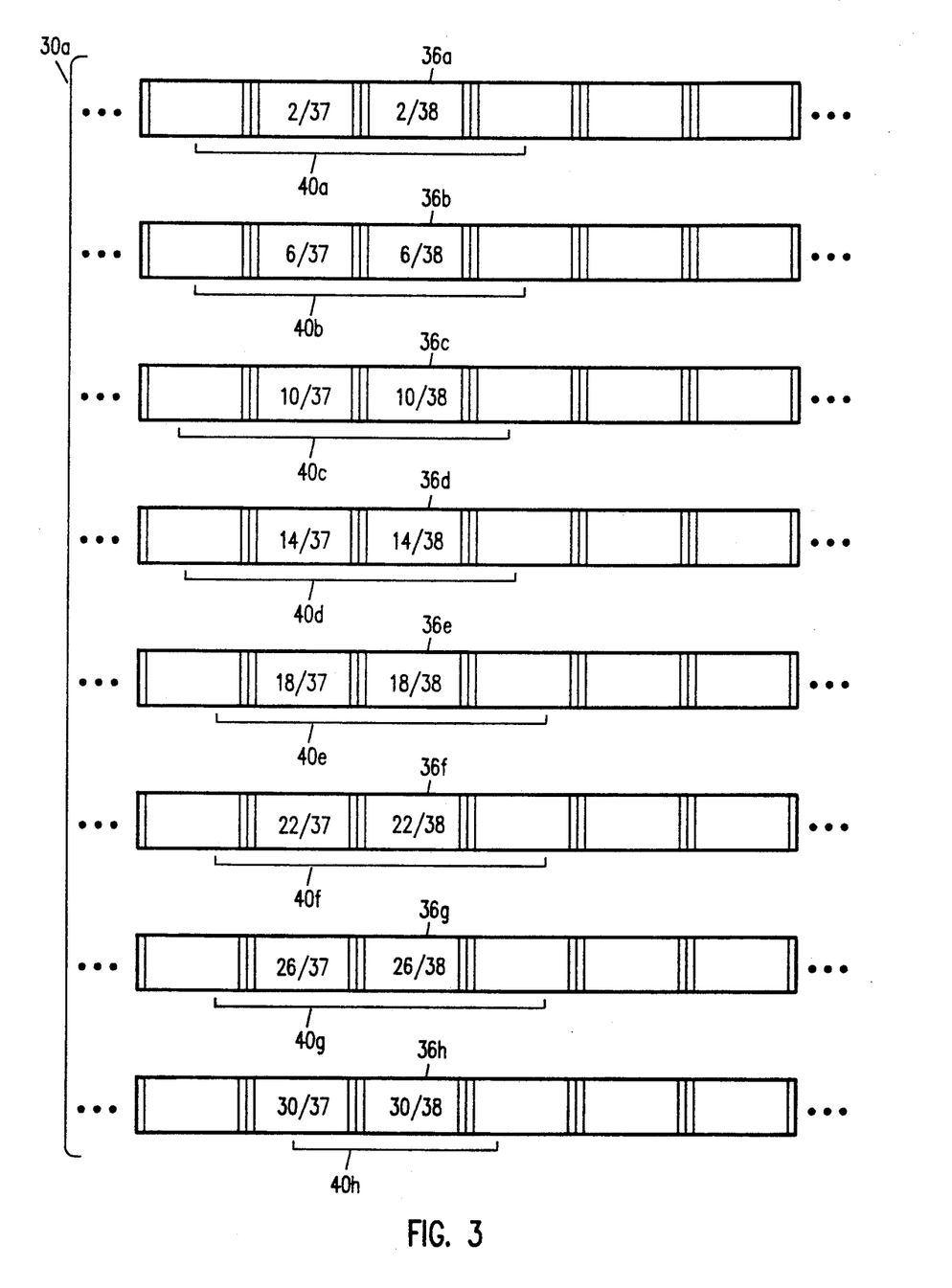
FIG. 3 illustrates time slot sequences, corresponding monitor intervals, and adaptation of monitor interval duration.

FIG. 3 illustrates the relative positioning of successive monitor intervals 40 relative to corresponding message time slots 36 and adaptation of the duration of a monitor interval 40 to conserve battery power. In FIG. 3, segments of consecutive time slots 36 are shown and each segment includes a time slot 36 associated with remote pager 10. Time slots 36a-36h are the eight time slots 36 of a time frame 30a associated with remote pager 10. Monitor intervals 40a-40g correspond to the first seven monitor intervals of time frame 30a. Each of the first seven monitor intervals 40a-40g of time frame 30a are approximately three times longer than each time slot 36. Remote pager 10 calculates an activation delay AD as described above in an attempt to center each time slot 36a-36g within the corresponding monitor interval 40a-40g.

Despite such calculation, each time slot 36a-36g is not exactly centered within the corresponding monitor interval 40a-40g. This discrepancy represents timing errors due to prevailing environmental conditions. It may be noted, however, that the timing errors are relatively consistent, each monitor interval 40a-40g begins early with respect to the corresponding time slot 36a-36g. More particularly, each interval 40a-40g begins a full time slot 36 before its associated time slot 36a-36g. As will be explained more fully hereafter, remote pager 10 is able to determine the position of each time slot 36 within the corresponding monitor interval 40. Thus, in the sequence of monitor intervals 40a-40g shown in FIG. 3, remote pager 10 determines that each monitor interval 40a-40g consistently begins at least a full time slot 36 early.

With this information, remote pager 10 determines that a shorter monitor interval 40 may be used while still reliably receiving message data. Because each of monitor intervals 40a-40g consistently begins a full time slot 36 before the corresponding time slot 36a-36g, remote pager 10 determines that monitor interval 40 may be reduced by the length of one time slot 36. Accordingly, the duration MI of monitor interval 40h is equal to two time slots 36. The activation delay AD is calculated based on the new, or shorter, monitor interval duration MI such that monitor interval 40h begins just before time slot 36h and terminates just following time slot 36h. Because monitor interval 40h is shorter than monitor intervals 40a-40g, less battery power is used. So long as the environmental conditions remain relatively static, this shortened monitor interval duration MI may be used to conserve battery power. If conditions suddenly change, causing monitor interval 40 to begin late or end early, monitor interval duration MI is increased and activation delay AD is recalculated.

Thus, adaptation of monitor interval 40h as shown in FIG. 3 is length adaption relative to the duration of time slot 36, or slot interval SI, to reduce radio receiver on time. Because it is desirable to capture data during at least one full time slot 36, length reduction of monitor interval MI is limited. For example, in FIG. 3 monitor interval 40h is equal to two slot intervals SI and will always span at least one time slot 36. Monitor interval MI could be reduced further, but the probability that each time slot 36 coincides with the corresponding monitor interval 40 is significantly reduced.

Figure 4:
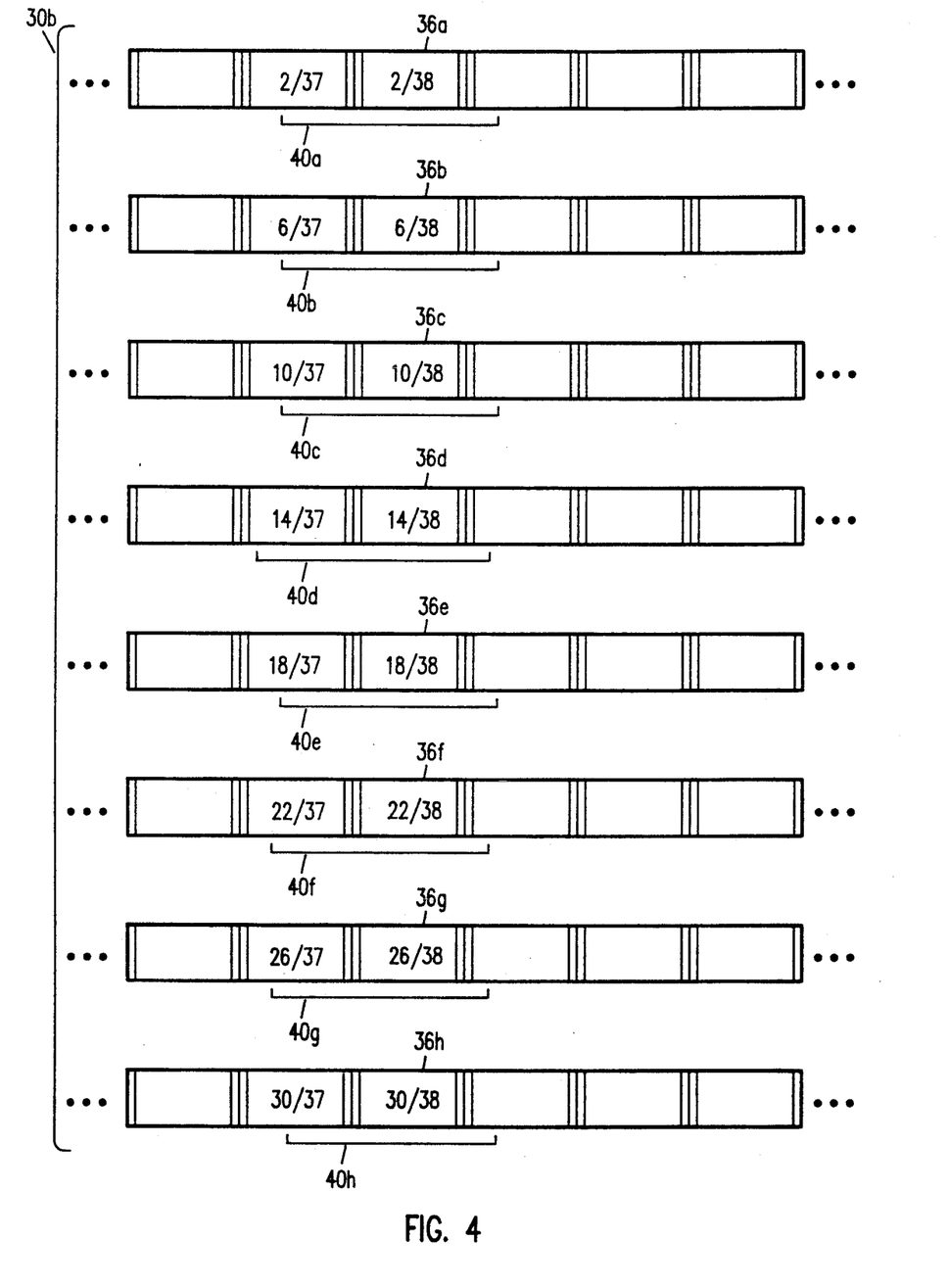
FIG. 4 illustrates time slot sequences, corresponding monitor intervals, and adaption of monitor interval registration.

FIG. 4 illustrates a second form of monitor interval adaptation for adjusting the commencement or registration of a monitor interval 40 relative to commencement of a corresponding time slot 36. In FIG. 4, a second time frame 30b is shown including a second cycle of time slots 36a-36h and associated monitor intervals 40a-40h. Registration adaption is used to center time slot 36h within the corresponding monitor interval 40h.

During monitor intervals 40a-40g of time frame 30b each corresponding time slot 36a-36g occurs late in the monitor interval. With such positioning comes an increased chance of missing message data because each time slot 36 occurs near the end of the monitor interval 40. In the event of a slight timing error causing monitor interval 40 to commence earlier relative to the corresponding time slot 36, the monitor interval could terminate before the end of time slot 36 resulting in lost message data. The same problem exists when the slots 36 occur near the beginning of monitor intervals 40. By attempting to center time slots 36 within the corresponding monitor interval 40, the risk of message data loss is reduced. Such centering is accomplished by adaptive registration of monitor intervals 40 relative to the corresponding time slots 36.

By noting the consistent positioning of time slots 36a–36g within the corresponding monitor intervals 40a–40g, it is possible to calculate a registration factor RF, which may be positive or negative. The registration factor RF adjusts commencement of the monitor intervals 40 to increase the probability of centering a time slot 36 within the corresponding monitor interval 40.

The registration factor RF may be incorporated into calculation of the activation delay AD as follows:

$$AD = BD - \frac{1}{2}(MI - SI) + RF$$

Where the variable BD represents the base delay or time between the end of a first time slot 36 and the beginning of a next time slot 36 in which message data for remote pager 10 may be present, the variable MI represents the duration of the monitor interval, the variable SI represents the duration of a time slot 36, and the variable RF represents the registration factor. The duration of time slots 36, the variable SI, is constant. The base delay BD is generally constant because the separation between time slots 36 associated with a given remote pager 10 is constant. However, the base delay BD could represent a separation between time slots 36 forming a portion of a linked chain of time slots 36 in which case the variable BD is not constant.

Adaption of monitor intervals 40 is then accomplished by calculating values for the variables MI and RF based on a recent history of timing errors. Timing errors are determined by locating a target or associated time slot 36 within data collected during the corresponding monitor interval 40. When such timing errors are found to be consistent, suitable values for the variables MI and RF are calculated to reduce radio on time and increase the probability of centering time slots 36 within corresponding monitor intervals 40.

Figure 5:
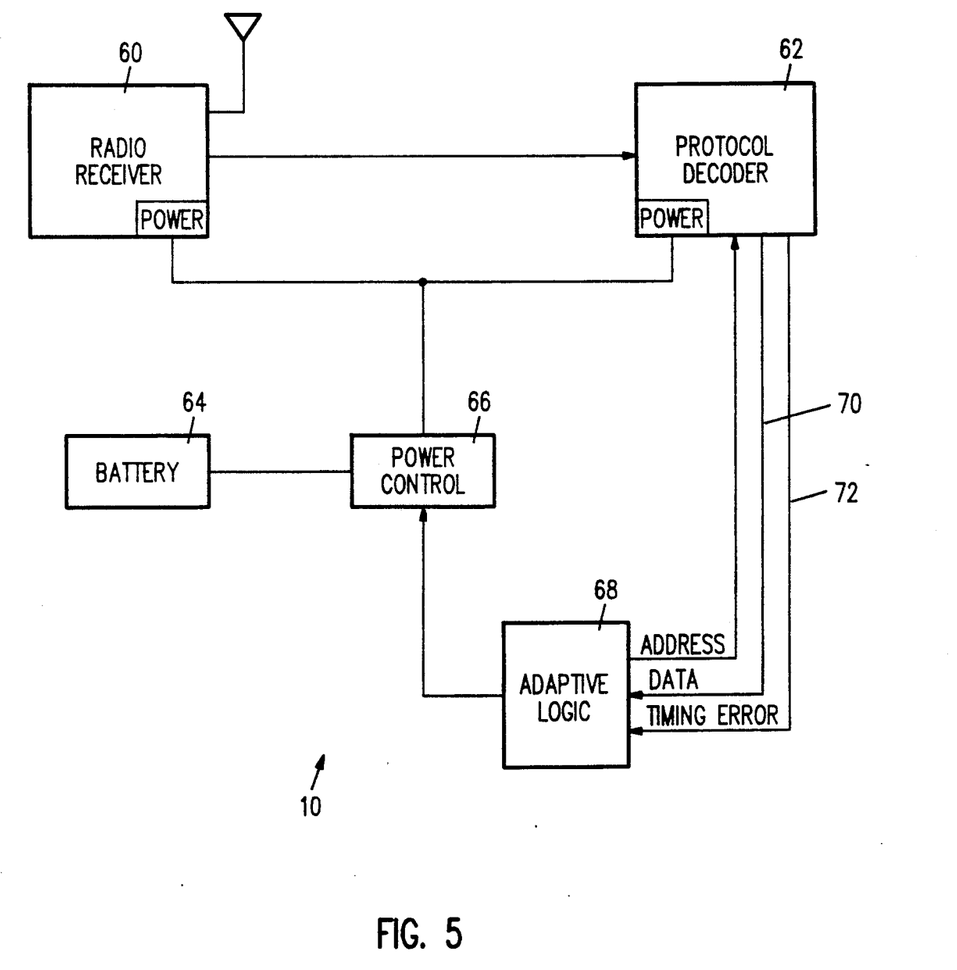
FIG. 5 is a block diagram of a remote pager using adaptive logic to control monitor interval registration and duration.

FIG. 5 illustrates a block diagram of remote pager 10. As fully described in U.S. Pat. No. 4,713,808, remote pager 10 includes a radio receiver 60 and a protocol decoder 62 coupled to a pager battery 64 by way of a power controller 66. Logic 68, including a microprocessor for controlling remote pager 10, operates control 66 to selectively power receiver 60 and decoder 62. Thus, a monitor interval 40 is initiated when logic 68 operates controller 66 to couple battery 64 to receiver 60 and decoder 62. During a monitor interval 40, receiver 60 receives message data by radio signal. Decoder 62 accepts the message data from receiver 60 to capture the message data, detect and delete flags 42 and 46 to separate the captured data into message packets corresponding to time slots 36, delete inserted zeros, correct errors if possible, and compare field 44 of each packet to a sub-frame and slot address provided by logic 68 to determine if message data for remote pager 10 has been received. Message packets found to be directed to remote pager 10 are passed to logic 68 along communication link 70.

In accordance with the present invention, protocol decoder 62 also provides, along communication link 72, information regarding the position of a target message packet, i.e., one associated with remote pager 10, within the data captured during the monitor interval. For example, decoder 62 reports to logic 68 the number of bits captured before capture of the target message packet. Because logic 68 is aware if the duration MI of the monitor interval and the duration SI of the time slot 36, it is able to determine the number of bits following the target message packet. Logic 68 thereby determines the position of the target time slot 36 within the associated monitor interval 40. More importantly, it determines the radio on time before receiving the target packet and after receiving the target packet. If the target packet is not found in the captured data, decoder 62 reports the address, i.e., sub-frame and slot number, of any message packets found in the captured data. Logic 68 is then able to suitably adjust the next monitor interval 40 to coincide with a target time slot 36.

Assuming the target message packet is detected in the captured data, decoder 62 reports a value BP representing the number of bits preceding the target message packet. When taken in conjunction with the duration MI of the monitor interval and the duration SI of time slot 36, the value BP represents a timing error. For a given transmission rate, the variables AD, MI, SI may be expressed as the number of bits transmitted during the corresponding time interval for comparison to the value of BP. For example, if BP equals $\frac{1}{2}(MI-SI)$ it is known that the target time slot 36 is centered within the corresponding monitor interval. If BP is greater than $\frac{1}{2}(MI-SI)$ then the target time slot 36 occurs during the latter half of the associated monitor interval 40, and if BP is less than $\frac{1}{2}(MI-SI)$ then it occurs early in the associated monitor interval.

In any case, logic 68 determines the relative position of each time slot 36 within the corresponding monitor interval 40. If decoder 82 reports a substantially consistent value BP for a series of monitor intervals 40, logic 68 may adapt the duration of the next monitor interval 40 to reduce radio receiver 60 on time, adapt the registration of the next monitor interval 40 to center the corresponding time slot 36 with the next monitor interval to increase the probability of reliable message receipt, or adapt both the duration and registration of the next monitor interval 40.

Figure 6:
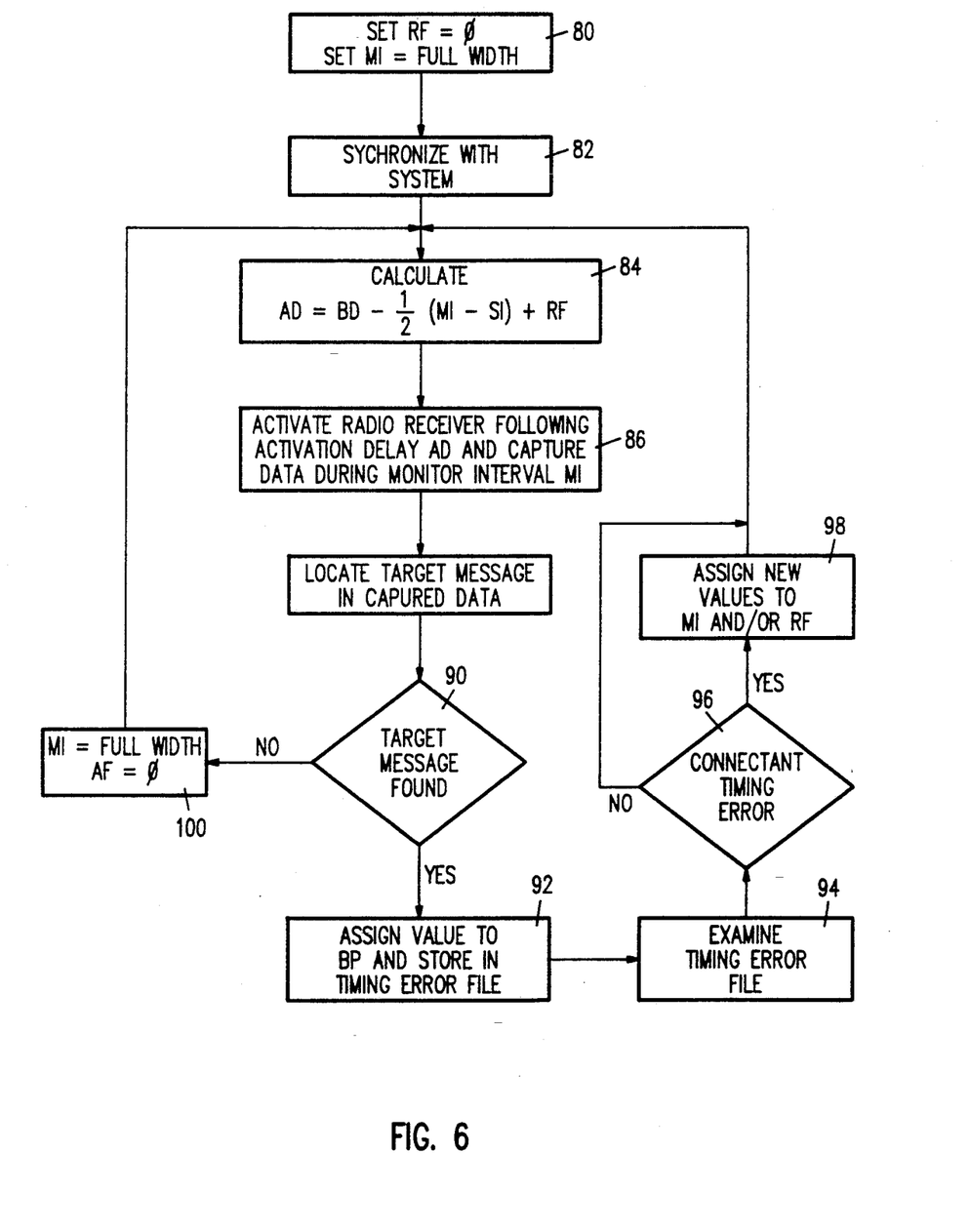
FIG. 6 is a flow chart illustrating the process of monitor interval duration and registration adaptation.

FIG. 6 illustrates the process of adapting monitor interval 40 based on a history of recent timing errors. In initialization block 80, remote pager 10 sets the variable MI to full width, a conservative monitor interval duration insuring coincidence with the associated time slot 36, and sets the variable RF to zero for no registration factor in calculation of the activation delay AD. In block 82, remote pager 10 activates radio receiver 60 to capture a message packet, determine its position with reference to time frame 30, synchronize itself with the paging system, and activate during a first time slot 36 associated with remote pager 10.

In block 84, remote pager 10 calculates an activation delay AD, the delay time between the end of a first time slot 36 associated with remote pager 10 and the beginning of the monitor interval corresponding to the next time slot 36 associated with remote pager 10. As noted above the activation delay is a function of the base delay BD, the monitor interval duration MI, the time slot 36 duration SI, and the registration factor RF. Because the registration factor is initially set to zero and the monitor interval duration MI is set to full width, the first activation delay AD calculation will result in a long monitor interval with a very high probability, despite current environmental conditions, of coinciding with the next associated time slot 36.

Following the activation delay AD, remote pager 10 activates radio receiver 60 in block 86 and captures data during a monitor interval 40. In block 88, remote pager 10 attempts to locate message data corresponding to its associated time slot 36 within the captured data. Assuming such message data is present in the captured data, processing passes through decision block 90 and into block 92 where remote pager 10 stores timing error BP in a timing error file.

In block 94, remote pager 10 analyzes the timing error file to detect a recent history of consistent timing errors. If a recent history of consistent timing errors is indicated by the timing error file, processing passes through decision block 96 to block 98. In block 98, new values for MI and/or RF are calculated to adapt the next monitor interval. Processing then returns to block 84 where the activation delay AD is calculated based on updated values for MI and RF. If the timing error file does not indicate a recent history of consistent timing errors, then processing branches at block 96 to return directly to block 84.

If at any time during this process the captured data does not contain target message data, it may be assumed that the monitor interval 40 did not coincide with the target time slot 36. In such case, processing branches at decision block 90 to block 100 where monitor interval 40 is returned to full width and the registration factor RF is reset to zero.

Thus, remote pager 10 responds to varying environmental conditions by adapting monitor interval 40. During periods of static environmental conditions, as indicated by consistent timing errors, remote pager 10 is able to reduce radio on time to conserve battery power, but responds to sudden changes in environmental conditions by providing a longer monitor interval. Message reliability is further improved by adaptive registration of monitor intervals 40 to generally center time slots 36 within corresponding monitor intervals 40.

While the present invention has been shown for adapting monitor interval 40 registration and duration with respect to a single time slot 36, it will be understood that the method of the present invention applies equally to adaptation of monitor interval 40 relative to a series of time slots 36 in which case the monitor interval 40 would desirably span such series of time slots 36 and the registration of such monitor interval could be adapted to center the series therein. The actual width of monitor interval 40 is an operating parameter dependent on the desired level of reliability in light of particular operating requirements. Also, the period during which timing errors are collected to adapt monitor interval 40 is a variable operating parameter. Thus, while in describing FIGS. 3 and 4 the last time slot 36 of each time frame 30 was adapted based on timing errors associated with the preceding seven time slots 36, it will be understood that several time frames 30 could provide a basis for adaptation of monitor interval 40. For example, if timing errors were collected for two time frames 30, then a history of approximately fifteen minutes of timing errors would be reflected in adaptation of monitor interval 40.

As noted above, the base delay BD is usually a fixed value because the offset between time slots 36a–36h, i.e. those time slots normally associated with remote pager 10, is constant. However, the Gaskill system also chains available time slots 36 whereby remote pager 10 receives pointers or continuation numbers indicating the next time slot 36 in a linked series of time slots 36. In such case the base delay BD is variable, equal to the separation between such linked time slots 36, and an adjustment may be necessary for the values of RF and MI. Because the values of RF and MI are based on detected timing errors associated with activation regarding the constant value of BD, the separation between time slots 36a–36h, it is necessary to proportion the value of RF, and possibly the value of MI, based on the proportional relationship between a current or variable value of BD and the constant value of BD.

While the present invention has been shown in the context of the Gaskill paging system, it should be understood that the scope of the present invention should not be so limited. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

We claim:

1. A radio paging system which operates according to a time slot protocol, said system having a radio transmitter and a periocially activated radio paging receiver synchronized for communication whereby the radio transmitter transmits a message to said paging receiver during predetermined message intervals and the paging receiver periodically activates to receive the transmitted message during a receiving interval, comprising the steps:

activating the radio paging receiver during a first receiving interval;

determining the relative occurrence of said first message interval to said first receiving interval; and adapting commencement of a second receiving interval to increase the probability that a second message interval corresponding to the second receiving interval will be substantially centered with respect to the second receiving interval, said adaptation being determined by the relative occurrence of the first message interval relative to the first receiving interval.

2. The method according to claim 1 further comprising the step of reducing the duration of the second receiving interval to reduce activation of the receiver device prior to and following said second message interval.

3. The method according to claim 2 further comprising:

activating the receiving device during a plurality of receiving intervals preceding said second receiving interval; and determining the occurrence of a corresponding plurality of message intervals relative to associated ones of said plurality of receiving intervals, whereby said adaptation is a function of substantially consistent positioning of said message intervals relative to said receiving intervals.

4. A paging system which transmits messages from a message clearinghouse to a remote pager according to a time slot protocol, both said a message clearinghouse and said remote pager referencing a common time frame, said pager having a time slot associated therewith, said clearing house transmitting message data during time slots associated with said remote pager, said remote pager activating a radio receiver during monitor intervals corresponding to time slots associated with said remote pager, adaptive logic in said remote pager for noting timing errors in connection with activation of said radio receiver and for affecting said monitor intervals based on noted timing errors, means in said adaptive logic for effecting the duration of one of said monitor intervals based on a recent history of consistent timing errors, and means in said adaptive logic for changing the commencement of one of said monitor intervals to increase the probability that a message interval associated with said one monitor interval is substantially centered with respect to said one monitor intervals.

* * * * *